(12) United States Patent
Hara et al.

(10) Patent No.: US 11,548,501 B2
(45) Date of Patent: Jan. 10, 2023

(54) PARKING ASSIST SYSTEM (71) Applicant: HONDA MOTOR CO., LTD., Tokyo (JP)

(72) Inventors: Yuki Hara, Saitama (JP); Yuki Nakada, Saitama (JP); Takuya Kashiki, Saitama (JP); Renji Kuriyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 17/215,896

(22) Filed: Mar. 29, 2021

(65) Prior Publication Data
US 2021/0300342 A1 Sep. 30, 2021

(30) Foreign Application Priority Data

Mar. 31, 2020 (JP) .............................. JP2020-062872

(51) Int. Cl.
H04N 5/44 (2011.01)
B60W 30/06 (2006.01)
B60W 30/09 (2012.01)
B60W 50/16 (2020.01)
B60W 10/18 (2012.01)
G06V 20/58 (2022.01)
B60W 50/14 (2020.01)

(52) U.S. Cl.
CPC ............ *B60W 30/06* (2013.01); *B60W 10/18* (2013.01); *B60W 30/09* (2013.01); *B60W 50/16* (2013.01); *G06V 20/58* (2022.01); *B60W 2050/143* (2013.01); *B60W 2050/146* (2013.01); *B60W 2510/18* (2013.01); *B60W 2540/12* (2013.01)

(58) Field of Classification Search
CPC ...... B60W 30/06; B60W 10/18; B60W 30/09; B60W 50/16; B60W 2050/143; B60W 2050/146; B60W 2510/18; B60W 2540/12; B60W 30/08; G06V 20/58; G06V 20/586; B62D 15/0285
See application file for complete search history.

(56) References Cited

U.S. PATENT DOCUMENTS 9,925,919 B2 * 3/2018 Kiyokawa .......... G01C 21/3629
10,155,540 B2 * 12/2018 Kiyokawa .......... B62D 15/0285
(Continued)

FOREIGN PATENT DOCUMENTS

JP 2007331479 A 12/2007

*Primary Examiner* — Munear T Akki
(74) *Attorney, Agent, or Firm* — Armstrong Teasdale LLP (57) ABSTRACT A parking assist system includes a control device. The control device continues an automatic parking process as a driver releases an operation on a brake pedal in a case where an obstacle is detected in a suspension area and an operation amount of the brake pedal has been equal to or more than a second threshold. The control device causes a brake device to stop a vehicle with a second brake force and suspends the automatic parking process in a case where the obstacle is detected in the suspension area and the operation amount of the brake pedal is less than the second threshold. The control device causes the brake device to stop the vehicle and cancels the automatic parking process in a case where the obstacle is detected in a cancellation area and the operation amount of the brake pedal is less than a first threshold.

6 Claims, 8 Drawing Sheets (56) References Cited

U.S. PATENT DOCUMENTS

| | | | |
|---|---|---|---|
| 2007/0288145 A1 | 12/2007 | Maeda et al. | |
| 2012/0138395 A1* | 6/2012 | Curtis | B60L 50/40 701/70 |
| 2013/0321143 A1* | 12/2013 | Boyer | B60Q 1/447 340/463 |
| 2016/0075327 A1* | 3/2016 | Kiyokawa | B62D 15/0285 701/301 |
| 2016/0075328 A1* | 3/2016 | Kiyokawa | B60W 30/06 701/41 |

* cited by examiner

PARKING ASSIST SYSTEM

TECHNICAL FIELD

The present invention relates to a parking assist system that autonomously moves a vehicle from a current position to a parking position or from the parking position to its vicinity.

BACKGROUND ART

During the execution of an automatic parking process by a parking assist system, a driver is required to monitor the surroundings and operate a vehicle as needed. Accordingly, the parking assist system determines how to execute a process in a case where the driver intervenes in the driving of the vehicle during the execution of the automatic parking process. For example, JP2007-331479A discloses that an automatic parking process is suspended in a case where the speed of a brake operation by a driver is high, while the automatic parking process is continued in a case where the speed of the brake operation by the driver is low.

However, the driver does not clearly understand a threshold of the speed of the brake operation related to these processes (namely, suspension or continuation of the automatic parking process). Accordingly, if the automatic parking process is suspended or continued depending on the speed of the brake operation, the driver cannot estimate one of these processes to which the current process will switch. Further, in a case where the parking assist system has a function of stopping the vehicle according to a brake operation by the parking assist system itself during the execution of the automatic parking process, it is necessary to determine which process to execute after the parking assist system stops the vehicle.

SUMMARY OF THE INVENTION

In view of such a problem of the prior art, a primary object of the present invention is to provide a parking assist system that enables the driver to easily understand which process will be executed after the brake operation is performed by the driver or the parking assist system.

To achieve such an object, one embodiment of the present invention provides a parking assist system (1) mounted on a vehicle including a powertrain (4), a brake device (5), and a steering device (6), the parking assist system (1) including: an external environment sensor (7) configured to detect an obstacle present around the vehicle; a brake pedal (24) operated by a driver to activate the brake device (5); a brake sensor (27) configured to acquire an operation amount of the brake pedal (24); a control device (15) configured to acquire a position of the obstacle with respect to the vehicle based on a detection result of the external environment sensor (7), and to control an automatic parking process to autonomously move the vehicle from a current position to a target position and to stop the vehicle; and an input/output device (14) configured to notify the driver of information and to receive an input operation by the driver, wherein the control device (15) is configured to set a cancellation area (51) within a prescribed range from the vehicle and a suspension area (52) located outside the cancellation area (51), and while executing the automatic parking process, the control device (15) continues the automatic parking process as the driver releases an operation on the brake pedal (24) in a case where the obstacle is detected in the suspension area (52) and the operation amount of the brake pedal (24) by the driver has been equal to or more than a second threshold to cause the brake device (5) to generate a second brake force, causes the brake device (5) to stop the vehicle with the second brake force and then suspends the automatic parking process such that the automatic parking process is resumable in a case where the obstacle is detected in the suspension area (52) and the operation amount of the brake pedal (24) by the driver is less than the second threshold, and causes the brake device (5) to stop the vehicle with a first brake force and then cancels the automatic parking process such that the automatic parking process is not resumable in a case where the obstacle is detected in the cancellation area (51) and the operation amount of the brake pedal (24) by the driver is less than a first threshold to cause the brake device (5) to generate the first brake force.

According to this configuration, when the automatic parking process is executed, the subsequent process is determined according to whether the driver or the control device performs the brake operation or whether the obstacle is in the suspension area or the cancellation area. Accordingly, the driver can understand which process will be executed after the brake operation is performed. Further, in a case where the driver performs the brake operation, it is assumed that the driver notices the obstacle and performs an appropriate operation. Accordingly, by continuing the automatic parking process in such a case, the continuity and safety of the automatic parking can be achieved simultaneously.

Preferably, while executing the automatic parking process, the control device (15) continues the automatic parking process as the driver releases the operation on the brake pedal (24) in a case where the obstacle is detected in the cancellation area (51) and the operation amount of the brake pedal (24) by the driver has been equal to or more than the first threshold.

According to this configuration, in a case where the driver performs the brake operation, the automatic parking process is continued not only when the obstacle is detected in the suspension area but also when the obstacle is detected in the cancellation area. Thus, the subsequent process in a case where the driver performs the brake operation is unified, so that the driver can easily understand which process will be executed after the brake operation is performed.

Preferably, the second brake force is smaller than the first brake force.

According to this configuration, the inertial force acting on the driver differs between a case where the obstacle is in the cancellation area and a case where the obstacle is in the suspension area. Accordingly, the driver can understand which process will be executed after the brake operation is performed by the control device based on the difference in the inertial force.

Preferably, in a case where the control device (15) suspends the automatic parking process such that the automatic parking process is resumable, the input/output device (14) notifies the driver of an inquiry as to whether to resume the automatic parking process.

According to this configuration, the inquiry as to whether to resume the automatic parking process is displayed on the input/output device. Accordingly, the driver can quickly choose whether to resume or cancel the automatic parking process.

Preferably, in the case where the control device (15) suspends the automatic parking process such that the automatic parking process is resumable, the input/output device (14) receives the input operation to resume the automatic parking process, and the control device (15) resumes the automatic parking process as the operation on the brake pedal (24) in an operated state is released.

According to this configuration, when the suspended automatic parking process is resumed, the driver is required to release the operation on the brake pedal in the operated state. Accordingly, it is possible to prevent the vehicle from starting to move suddenly.

Preferably, the control device (15) is configured to further set a warning area (53) located outside the suspension area (52) with respect to the vehicle, and while executing the automatic parking process, the control device (15) continues the automatic parking process as the driver releases the operation on the brake pedal (24) in a case where the obstacle is detected in the warning area (53) and the operation amount of the brake pedal (24) by the driver has been equal to or more than a third threshold to cause the brake device (5) to generate a third brake force smaller than the second brake force, and continues the automatic parking process while decelerating or stopping the vehicle with the third brake force and/or causing the input/output device (14) to notify the driver that the obstacle is detected in a case where the obstacle is detected in the warning area (53) and the operation amount of the brake pedal (24) by the driver is less than the third threshold.

According to this configuration, in a case where the obstacle enters the warning area, the automatic parking process is continued while the vehicle is decelerated or stopped and/or the warning is given. Accordingly, it is possible to prompt the driver to pay attention while preventing the time required for the automatic parking process from being increased.

Thus, according to the above configurations, it is possible to provide a parking assist system that enables the driver to easily understand which process will be executed after the brake operation is performed by the driver or the parking assist system.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to move the vehicle autonomously.

Figure 1:
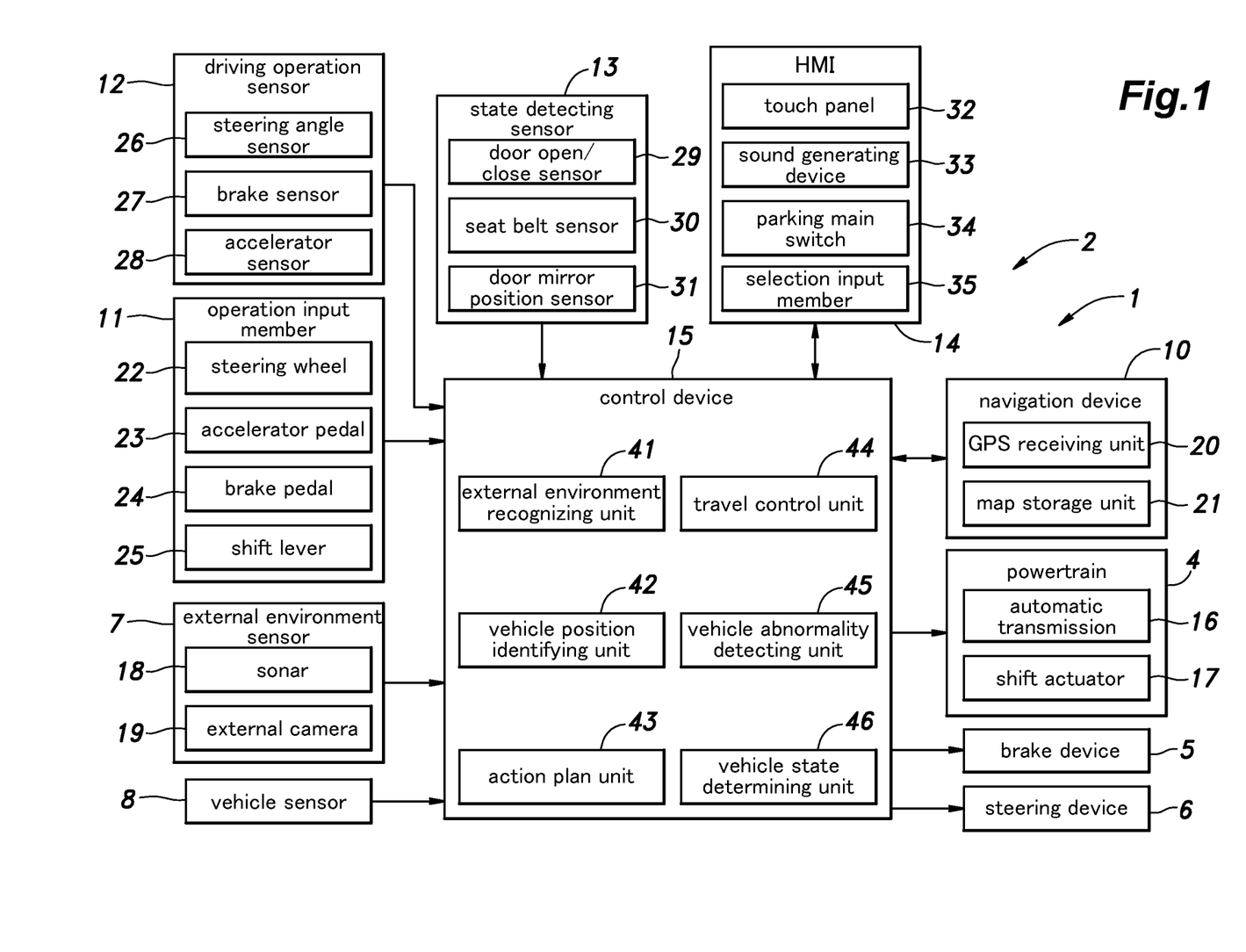
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device 5a configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the moving direction as viewed from above. The control device 15 may generate the look-down image by combining the images of the front camera, the rear camera, and the left and right side cameras, and may generate the bird's-eye image by combining the image captured by the front camera or the rear camera facing the moving direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15, the brake pedal 24 as a brake input member, the driving operation sensor 12, and the state detecting sensor 13.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to move the vehicle.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for moving the vehicle autonomously (for example, the external environment sensor 7, the vehicle sensor 8, and the GPS receiving unit 20). Further, the vehicle abnormality includes failure of the HMI 14.

In the present embodiment, the vehicle abnormality detecting unit 45 can detect an abnormality in the screen display of the touch panel 32 based on at least a signal from the touch panel 32.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

Also, when it is determined, based on the detection result of the state detecting sensor 13, that the door is opened and the seat belt is released, the vehicle state determining unit 46 determines that the alighting intention of the occupant is certain and that the vehicle is in a cancellation state in which the autonomous movement (namely, the autonomous parking operation or the autonomous unparking operation) of the vehicle should be canceled. In addition, the vehicle state determining unit 46 may determine that the vehicle is in the cancellation state when there is an input to a cancellation button displayed on the touch panel 32 while the vehicle is moving autonomously.

In the present embodiment, each vehicle seat provided in the vehicle cabin is provided with a seating sensor configured to detect seating of the occupant. The vehicle state determining unit 46 determines a seating position of the occupant (namely, the vehicle state determining unit 46 identifies the vehicle seat on which the occupant is seated) based on a signal from the seating sensor, and determines that the vehicle is in the cancellation state when the seat belt at the seating position is released and the door near the seating position is opened.

As described above, the driving operation sensor 12 and the state detecting sensor 13 each correspond to the vehicle state detecting device configured to detect the state of the vehicle (for example, the prohibition state in which the autonomous parking operation or the autonomous unparking operation of the vehicle should be prohibited). The vehicle state determining unit 46 determines the state of the vehicle based on the detection results of the driving operation sensor 12 and the state detecting sensor 13. By using the driving operation sensor 12, it is possible to easily detect the override operation of the occupant. By using the state detecting sensor 13, it is possible to easily detect an alighting operation of the user and a change in the state of the vehicle according to an extending/retracting operation of the door mirror.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is moving at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first causes the touch panel 32 to display a parking search screen for setting the target parking position. After the target parking position is set, the action plan unit 43 causes the touch panel 32 to display a parking screen. When executing the automatic unparking process, the action plan unit 43 first causes the touch panel 32 to display an unparking search screen for setting the target unparking position. After the target unparking position is set, the action plan unit 43 causes the touch panel 32 to display an unparking screen.

Figure 2:
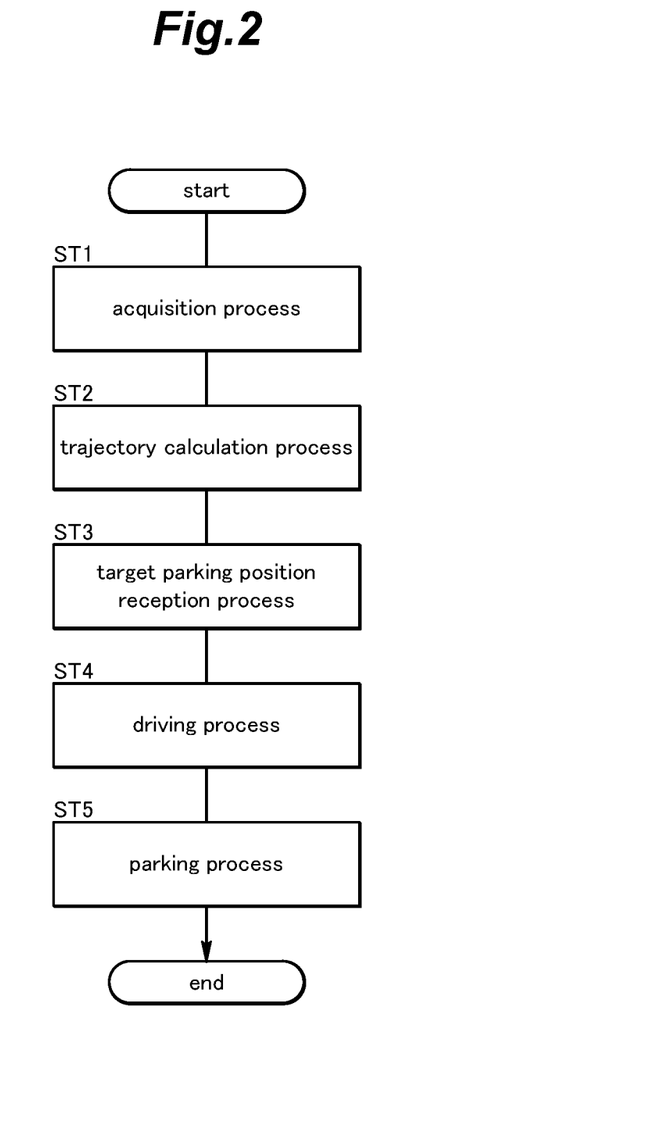
FIG. 2 is a flowchart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first causes the touch panel 32 of the HMI 14 to display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and causes the touch panel 32 to display the parking position candidate on the screen (the parking search screen). In a case where the trajectory of the vehicle cannot be calculated due to the presence of the obstacle, the action plan unit 43 does not set the parking space as a parking position candidate and does not cause the touch panel 32 to display the parking space on the screen. When the action plan unit 43 sets multiple parking position candidates (namely, multiple parking places for which the trajectory of the vehicle can be calculated), the action plan unit 43 causes the touch panel 32 to display these parking position candidates.

Figure 3A:
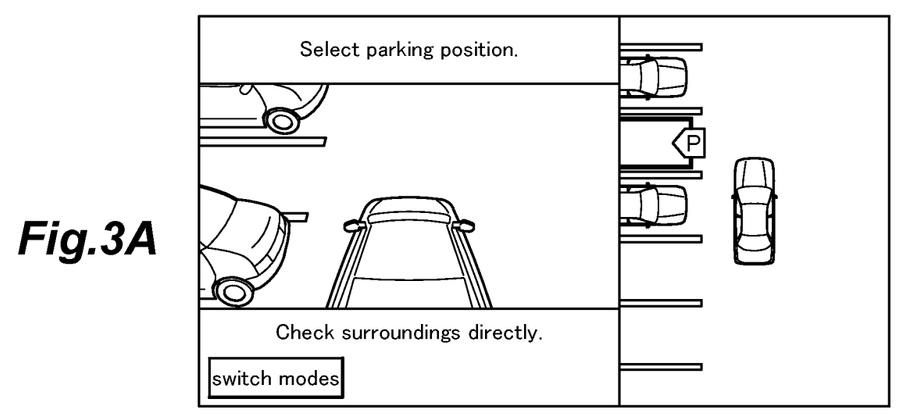
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 causes the touch panel 32 to display the look-down image and the bird's-eye image in the moving direction on the parking search screen shown in FIG. 3A. When the action plan unit 43 acquires at least one parking position candidate, the action plan unit 43 causes the touch panel 32 to display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 causes the touch panel 32 to display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
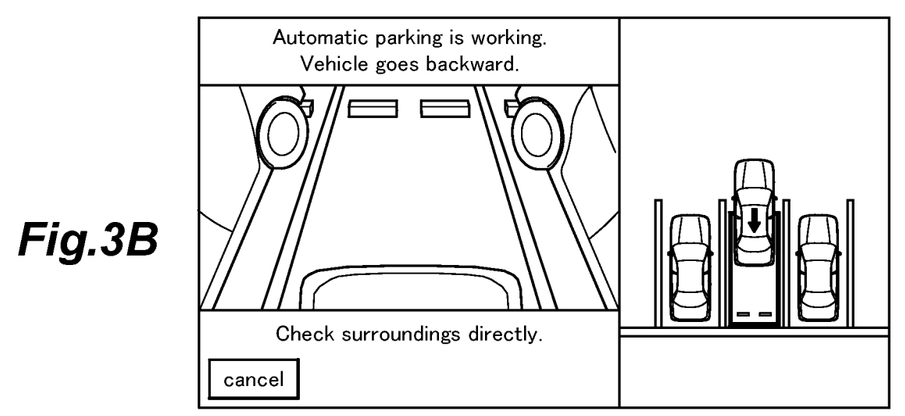
FIG. 3B is a diagram showing the screen display of the touch panel during a driving process in the parking assist system according to the embodiment.

After the vehicle is stopped and the target parking position is selected by the driver, the action plan unit 43 causes the touch panel 32 to switch the screen from the parking search screen to the parking screen. As shown in FIG. 3B, the parking screen is a screen in which an image in the moving direction of the vehicle (hereinafter referred to as "moving direction image") is displayed on the left half of the touch panel 32 and the look-down image including the vehicle and its surrounding area is displayed on the right half thereof. At this time, the action plan unit 43 may cause the touch panel 32 to display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to move the vehicle along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle moves along the calculated trajectory. At this time, the action plan unit 43 controls the powertrain 4, the brake device 5, and the steering device 6 so as to execute a switching operation for switching the moving direction of the vehicle (a reversing operation for reversing the moving direction of the vehicle). The switching operation may be executed repeatedly, or may be executed only once.

During the driving process, the action plan unit 43 may acquire the moving direction image from the external cameras 19 and cause the touch panel 32 to display the acquired moving direction image on the left half thereof. For example, as shown in FIG. 3B, when the vehicle is moving backward, the action plan unit 43 may cause the touch panel 32 to display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device 5a, and causes the touch panel 32 to display a pop-up window (see FIG. 3C) indicating that the automatic parking of the vehicle has been completed. The pop-up window may be displayed on the screen of the touch panel 32 for a prescribed period. Thereafter, the action plan unit 43 may cause the touch panel 32 to switch the screen to an operation screen of the navigation device 10 or a map screen.

Figure 3C:
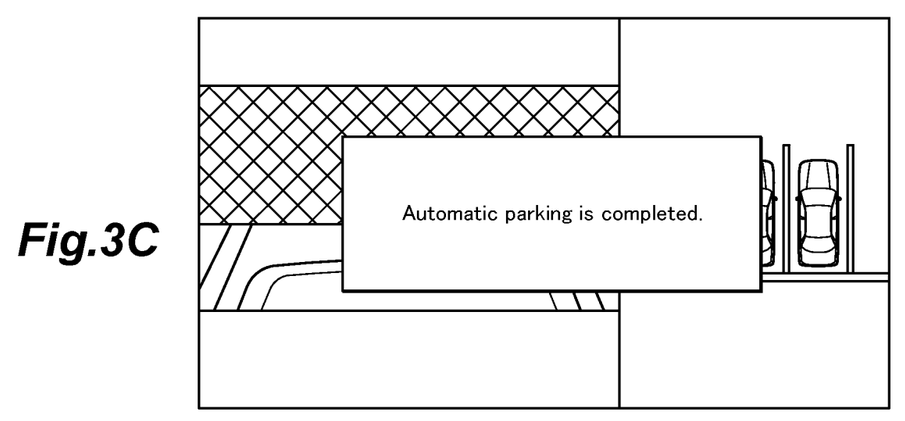
FIG. 3C is a diagram showing the screen display of the touch panel when automatic parking is completed in the parking assist system according to the embodiment.

In the parking process, there may be a case where the shift position cannot be changed to the parking position because of an abnormality of the shift actuator 17 or a case where the parking brake device 5a cannot be driven because of an abnormality of the parking brake device 5a. In these cases, the action plan unit 43 may cause the touch panel 32 to display the cause of the abnormality on the screen thereof.

Next, in the automatic parking process, the control in a case where the external environment sensor 7 detects the obstacle after the driving process (step ST4 in FIG. 2) is started will be described with reference to FIGS. 1, 4A, 4B, and 5 to 8.

Figure 4A:
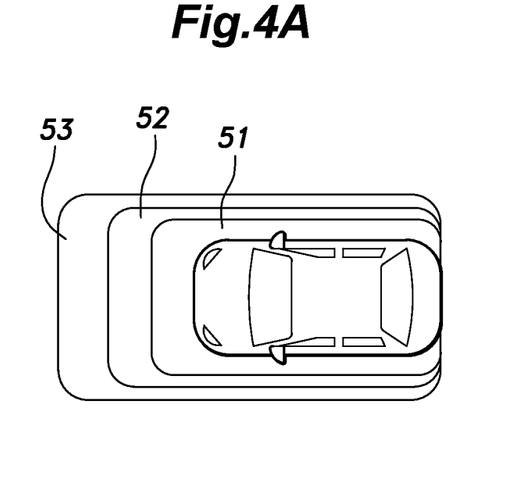
FIG. 4A is a diagram showing a cancellation area, a suspension area, and a warning area when the vehicle is moving forward in the parking assist system according to the embodiment.
Figure 4B:
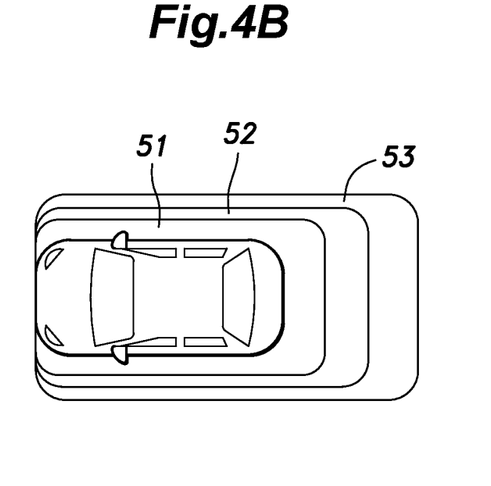
FIG. 4B is a diagram showing the cancellation area, the suspension area, and the warning area when the vehicle is moving backward in the parking assist system according to the embodiment.

As shown in FIGS. 4A and 4B, a cancellation area 51 within a prescribed range from the vehicle, a suspension area 52 located outside the cancellation area 51, and a warning area 53 located outside the suspension area 52 are set around the vehicle. The cancellation area 51, the suspension area 52, and the warning area 53 are areas to detect the obstacle that may collide with the vehicle. These areas 51 to 53 are set more forward than the rear end of the vehicle when the vehicle is moving forward (see FIG. 4A), and are set more backward than the front end of the vehicle when the vehicle is moving backward (see FIG. 4B).

As shown in FIGS. 1, 4A, 4B, and 5, the travel control unit 44 of the control device 15 moves the vehicle along the trajectory calculated by the action plan unit 43 of the control device 15 (step ST11). The external environment recognizing unit 41 of the control device 15 determines whether the obstacle is present in the cancellation area 51, the suspension area 52, or the warning area 53 with respect to the vehicle based on the detection result of the external environment sensor 7 (steps ST12 to ST14). In a case where the external environment recognizing unit 41 of the control device 15 determines that the obstacle is present in the cancellation area 51, the suspension area 52, or the warning area 53 ("Yes" in steps ST12 to ST14), the control device 15 executes a first process, a second process, or a third process, respectively (steps ST15 to ST17). For example, in a case where the obstacle moves toward the vehicle during the execution of the third process (step ST15), or in a case where the vehicle moves toward the obstacle after the execution of the third process (step ST15), it is assumed that the obstacle is detected in the suspension area 52 set inside the warning area 53. Similarly, in a case where the obstacle moves toward the vehicle during the execution of the second process (step ST16), or in a case where the vehicle moves toward the obstacle after the execution of the second process (step ST16), it is assumed that the obstacle is detected in the cancellation area 51 set inside the suspension area 52.

Figure 5:
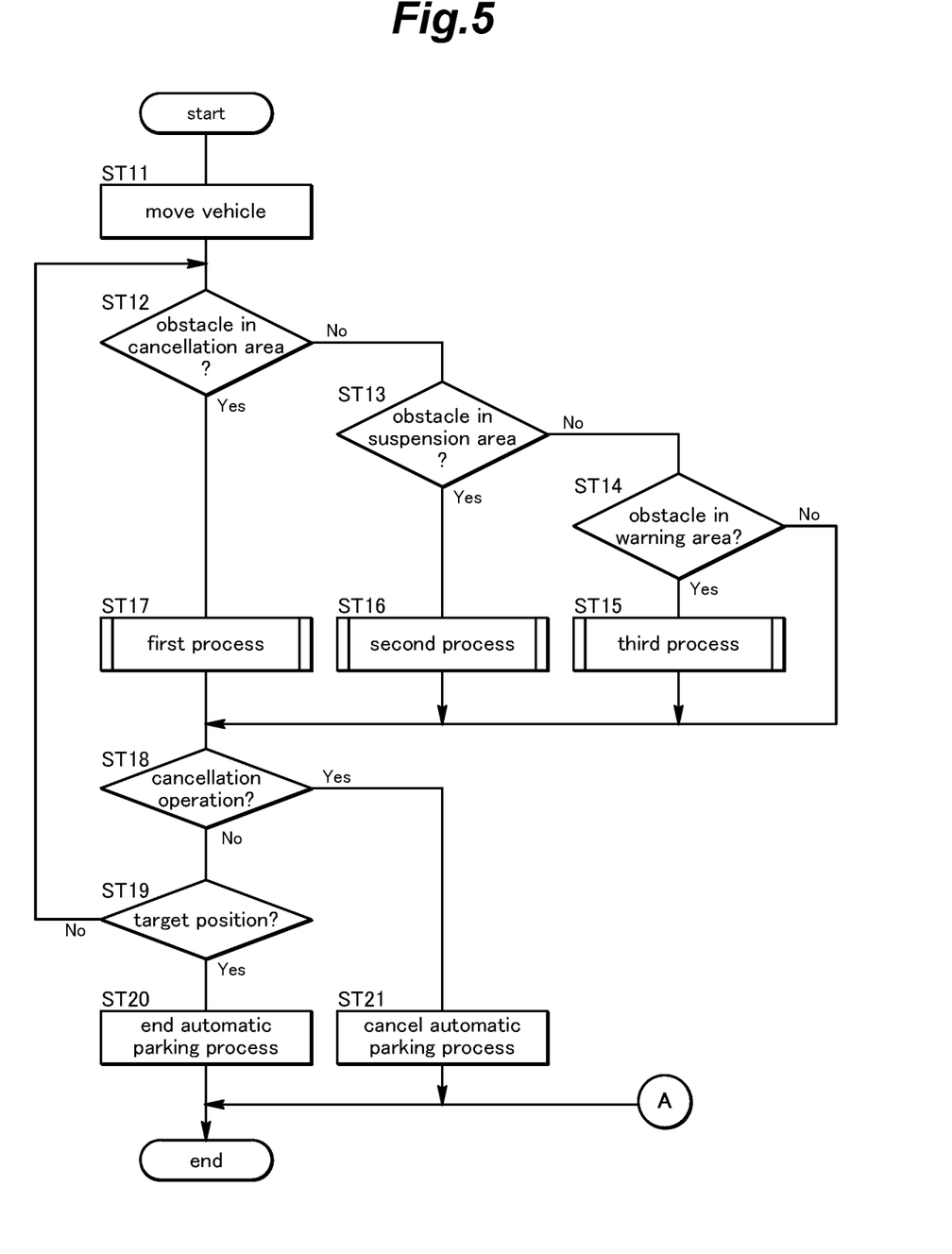
FIG. 5 is a flowchart showing the driving process and a parking process in the parking assist system according to the embodiment.

In a case where any one of the first to third processes (steps ST15 to ST17) is executed, or in a case where no obstacle is detected in any one of the cancellation area 51, the suspension area 52 and the warning area 53 ("No" in steps ST12 to ST14), the control device 15 determines whether a cancellation operation is performed by the driver or the passenger (step ST18) and whether the vehicle reaches the target position (step ST19). In a case where the cancellation operation is not performed by the driver or the passenger ("No" in step ST18) and the vehicle does not reach the target position ("No" in step ST19), the process returns to step ST12. When the vehicle reaches the target position (Yes in step ST19), the control device 15 executes the parking process (step ST5 in FIG. 2) and ends the automatic parking process (step ST20). In a case where the driver or the passenger performs the cancellation operation before the vehicle reaches the target position ("Yes" in step ST18), the control device 15 stops the vehicle and cancels the automatic parking process (step ST21). "Cancellation" of the automatic parking process means a state where the autonomous movement of the vehicle along the calculated trajectory cannot be resumed and the acquisition process (step ST1 in FIG. 2) and its subsequent processes need to be redone so as to execute the automatic parking process. The cancellation operation by the driver or the passenger includes the opening of the door, the release of the seat belt, the input on the cancellation button displayed on the touch panel 32, the operation on the steering wheel 22, and the pressing on the accelerator pedal 23.

Next, the third process (step ST15 in FIG. 5) will be described with reference to FIGS. 1, 4A, 4B, and 6. In a case where the driver operates the brake pedal 24 appropriately when the obstacle is detected in the warning area 53, it is assumed that the driver notices the obstacle and takes appropriate action to prevent the obstacle from colliding with the vehicle. At the start of the third process, the vehicle state determining unit 46 of the control device 15 determines whether the operation amount of the brake pedal 24 by the driver is equal to or more than a third threshold based on a detection result of the brake sensor 27 (step ST31). The third threshold is a threshold to cause the brake device 5 to generate a third brake force (a first brake force, a second brake force, a first threshold, and a second threshold will be described later). In a case where the vehicle state determining unit 46 determines that the operation amount of the brake pedal 24 by the driver is equal to or more than the third threshold ("Yes" in step ST31), the brake device 5 is activated according to the operation on the brake pedal 24 by the driver, and the vehicle is decelerated or stopped accordingly. For example, the third brake force has the strength (magnitude) to decelerate the vehicle to a prescribed speed before the obstacle enters the suspension area 52. Alternatively, the third brake force has the strength (magnitude) to stop the vehicle before the obstacle detected in the warning area 53 collides with the vehicle. Next, the vehicle state determining unit 46 determines whether the operation on the brake pedal 24 (namely, the brake operation) by the driver is released based on the detection result of the brake sensor 27 (step ST32). In a case where the vehicle state determining unit 46 determines that the operation on the brake pedal 24 by the driver is released (Yes in step ST32), the control device 15 continues the automatic parking process (step ST33).

Figure 6:
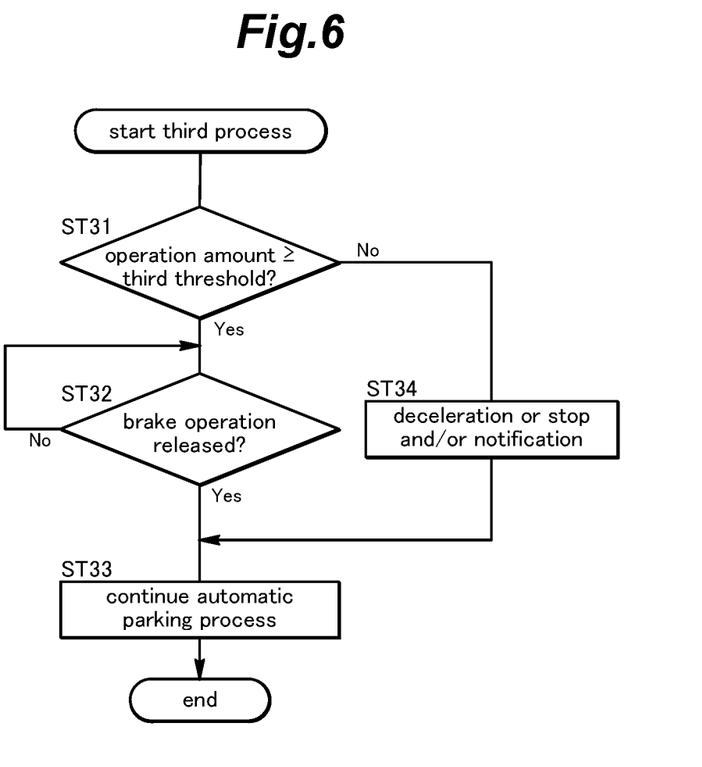
FIG. 6 is a flowchart showing a third process in the parking assist system according to the embodiment.

When the obstacle is detected in the warning area 53, in a case where the driver does not operate the brake pedal 24 or the operation amount thereof is insufficient for a preparation operation to avoid the obstacle, the driver may not notice the obstacle or may not perform an appropriate operation even though noticing the obstacle. At the start of the third process, in a case where the vehicle state determining unit 46 determines that the driver does not operate the brake pedal 24 or the operation amount thereof is insufficient, namely, the operation amount of the brake pedal 24 by the driver is less than the third threshold ("No" in step ST31), the travel control unit 44 activates the brake device 5 such that the brake device 5 generates the third brake force, thereby decelerating or stopping the vehicle and/or causing the Human Machine Interface 14 (HMI) to notify the driver that the obstacle is approaching or to give a warning (step ST34). The notification or warning by the HMI 14 is selected from the display of a message on the touch panel 32, the output of a message or warning sound by the sound generating device 33, the vibration of the seat or seat belt, and the combination thereof. After that, the control device 15 continues the automatic parking process (step ST33).

On continuing the automatic parking process (step ST33) and returning to the flow of FIG. 5, the control device 15 does not regard the obstacle that has caused the third process as the obstacle in the warning area 53.

Next, the second process (step ST16 in FIG. 5) will be described with reference to FIGS. 1, 4A, 4B, and 7. In a case where the driver operates the brake pedal 24 appropriately when the obstacle is detected in the suspension area 52, it is assumed that the driver notices the obstacle and takes appropriate action to prevent the obstacle from colliding with the vehicle. At the start of the second process, the vehicle state determining unit 46 determines whether the operation amount of the brake pedal 24 by the driver is equal to or more than the second threshold based on the detection result of the brake sensor 27 (step ST41). The second threshold is a threshold to cause the brake device 5 to generate the second brake force. In a case where the vehicle state determining unit 46 determines that the operation amount of the brake pedal 24 by the driver is equal to or more than the second threshold ("Yes" in step ST41), the brake device 5 is activated according to the operation on the brake pedal 24 by the driver, and the vehicle is decelerated or stopped accordingly. The second brake force is greater than the third brake force (namely, the second threshold is greater than the third threshold). For example, the second brake force has the strength (magnitude) to stop the vehicle before the obstacle detected in the suspension area 52 collides with the vehicle. Next, the vehicle state determining unit 46 determines whether the operation on the brake pedal 24 (namely, the brake operation) by the driver is released based on the detection result of the brake sensor 27 (step ST42). In a case where the vehicle state determining unit 46 determines that the operation on the brake pedal 24 by the driver is released (Yes in step ST42), the control device 15 continues the automatic parking process (step ST43).

Figure 7:
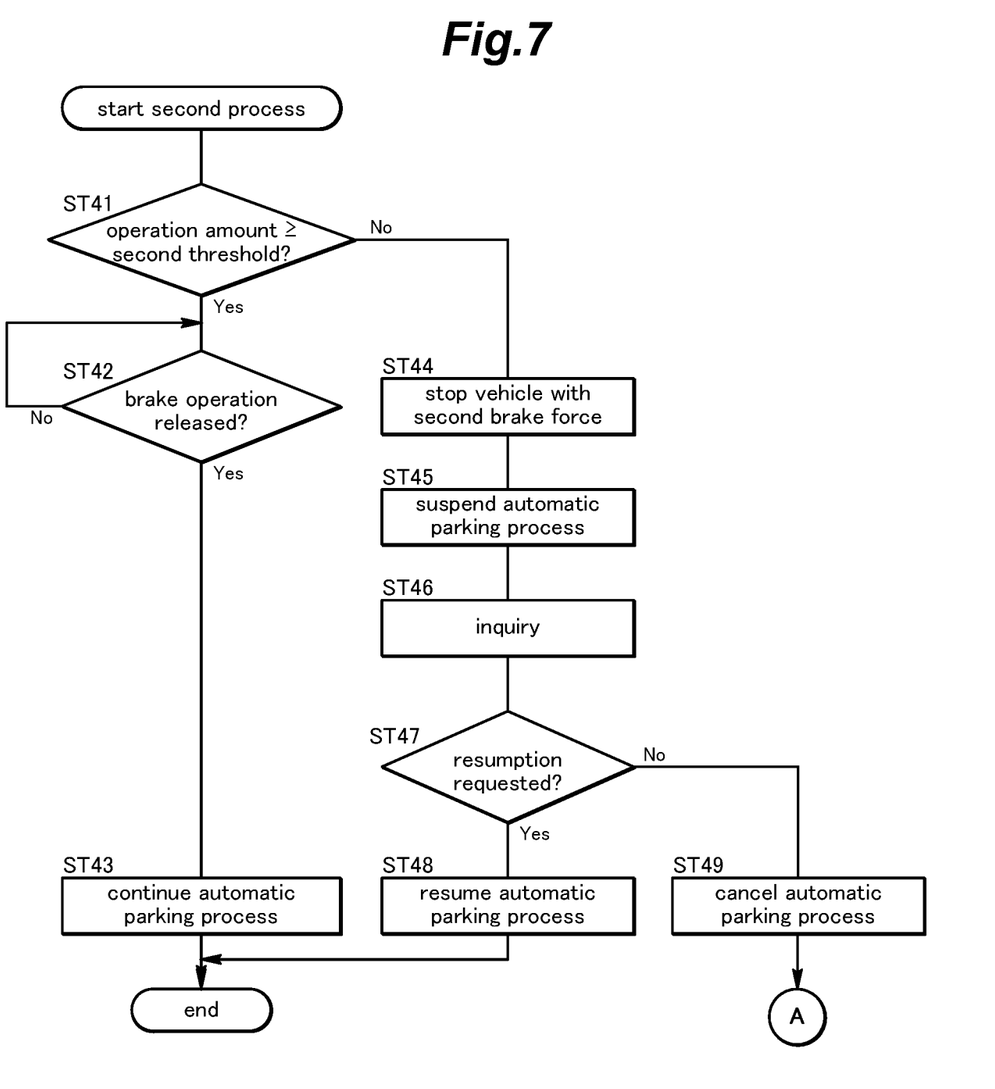
FIG. 7 is a flowchart showing a second process in the parking assist system according to the embodiment.

When the obstacle is detected in the suspension area 52, in a case where the driver does not operate the brake pedal 24 or it is assumed that the obstacle will collide with the vehicle even though the driver operates the brake pedal 24, the driver may not notice the obstacle or may not perform an appropriate operation even though noticing the obstacle. At the start of the second process, in a case where the vehicle state determining unit 46 determines that the driver does not operate the brake pedal 24 or the operation amount thereof is insufficient, namely, the operation amount of the brake pedal 24 by the driver is less than the second threshold ("No" in step ST41), the travel control unit 44 activates the brake device 5 to stop the vehicle with the second brake force (step ST44), and suspends the automatic parking process (step ST45). Also, the control device 15 causes the touch panel 32 to display a resumption button and the cancellation button for the automatic parking process, thereby asking the driver whether to resume the automatic parking process, namely, thereby giving an inquiry as to whether to resume the automatic parking process (step ST46).

Thereafter, upon receiving a signal (more specifically, a signal that the resumption button is pressed) from the touch panel 32, namely, upon determining that the driver requests the resumption of the automatic parking process ("Yes" in step ST47), the control device 15 resumes the automatic parking process (step ST48). As described above, "suspension" of the automatic parking process means a state where the vehicle is stopped and a prescribed operation such as pressing of the resumption button is required so as to resume the movement of the vehicle along the calculated trajectory. When the automatic parking process is resumed, it is preferable that the movement of the vehicle should be started as the driver shifts from a state of operating (pressing) the brake pedal 24 to a state of releasing the operation (pressing) on the brake pedal 24. On continuing the automatic parking process (step ST43) or resuming the automatic parking process (step ST48) and returning to the flow of FIG. 5, the control device 15 does not regard the obstacle that has caused the second process as the obstacle in the suspension area 52 and the warning area 53.

Upon receiving a signal (more specifically, a signal that the cancellation button is pressed) from the touch panel 32 or determining that the cancellation operation other than the pressing on the cancellation button is performed, namely, upon determining that the driver does not request the resumption of the automatic parking process ("No" in step ST47), the control device 15 cancels the automatic parking process (step ST49).

Next, the first process (step ST17 in FIG. 5) will be described with reference to FIGS. 1, 4A, 4B, and 8. In a case where the driver operates the brake pedal 24 appropriately when the obstacle is detected in the cancellation area 51, it is assumed that the driver notices the obstacle and takes appropriate action to prevent the obstacle from colliding with the vehicle. At the start of the first process, the vehicle state determining unit 46 determines whether the operation amount of the brake pedal 24 by the driver is equal to or more than the first threshold based on the detection result of the brake sensor 27 (step ST51). The first threshold is a threshold to cause the brake device 5 to generate the first brake force. In a case where the vehicle state determining unit 46 determines that the operation amount of the brake pedal 24 by the driver is equal to or more than the first threshold ("Yes" in step ST51), the brake device 5 is activated according to the operation on the brake pedal 24 by the driver, and the vehicle is decelerated or stopped accordingly. The first brake force is greater than the second brake force (namely, the first threshold is greater than the second threshold). For example, the first brake force has the strength (magnitude) to stop the vehicle before the obstacle detected in the cancellation area 51 collides with the vehicle. Next, the vehicle state determining unit 46 determines whether the operation on the brake pedal 24 (namely, the brake operation) by the driver is released based on the detection result of the brake sensor 27 (step ST52). In a case where the vehicle state determining unit 46 determines that the operation on the brake pedal 24 by the driver is released (Yes in step ST52), the control device 15 continues the automatic parking process (step ST53). Unlike the second process and the third process, on continuing the automatic parking process (step ST53) and returning to the flow of FIG. 5, it is preferable that the control device 15 should regard the obstacle that has caused the first process as the obstacle within the cancellation area 51.

Figure 8:
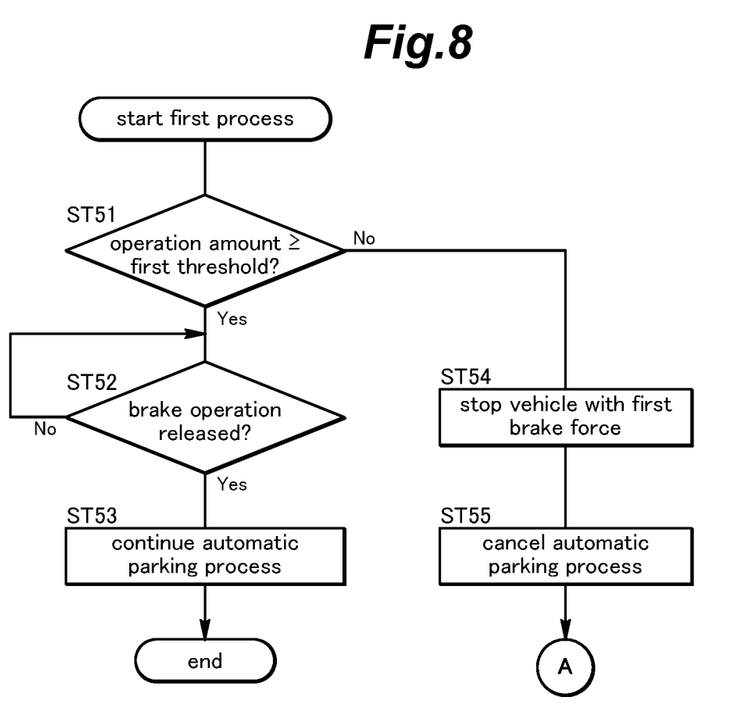
FIG. 8 is a flowchart showing a first process in the parking assist system according to the embodiment.

When the obstacle is detected in the cancellation area 51, in a case where the driver does not operate the brake pedal 24 or it is assumed that the obstacle will collide with the vehicle even though the driver operates the brake pedal 24, the driver may not notice the obstacle or may not perform an appropriate operation even though noticing the obstacle. At the start of the first process, in a case where the vehicle state determining unit 46 determines that the driver does not operate the brake pedal 24 or the operation amount thereof is insufficient, namely, the operation amount of the brake pedal 24 by the driver is less than the first threshold ("No" in step ST51), the travel control unit 44 activates the brake device 5 to stop the vehicle with the first brake force (step ST54), and cancels the automatic parking process (step ST55).

In a case where the driver performs the brake operation by himself/herself with an appropriate operation amount during the execution of the automatic parking process, the automatic parking process is continued even if the vehicle is stopped. On the other hand, in a case where the parking assist system 1 performs the brake operation, the continuation, suspension, or cancellation of the automatic parking process is determined based on the position of the obstacle with respect to the vehicle. Accordingly, the driver can easily understand which process will be performed after the brake operation is performed during the execution of the automatic parking process. In a case where the driver performs the brake operation by himself/herself with an appropriate operation amount, it is assumed that the driver notices the obstacle and performs an appropriate operation. Accordingly, even if the automatic parking process is continued, the safety can be ensured.

In a case where the parking assist system 1 performs the brake operation during the execution of the automatic parking process and the distance from the vehicle to the obstacle is long, the vehicle is stopped or decelerated with a relatively weak braking force. Accordingly, the inertial force applied to the occupant is reduced, so that the discomfort of the occupant can be relieved. Further, in a case where the parking assist system 1 performs the brake operation during the execution of the automatic parking process and the distance from the vehicle to the obstacle is short, the vehicle is stopped with a relatively great braking force. Accordingly, the moving distance of the vehicle before the stop thereof is shortened, so that the obstacle can be prevented from colliding with the vehicle. Further, in a case where the parking assist system 1 performs the brake operation, the inertial force acting on the driver differs between a case where the obstacle is present in the suspension area 52 and a case where the obstacle is present in the cancellation area 51. Accordingly, the driver can easily understand which process will be performed after the brake operation is performed during the execution of the automatic parking process based on the difference in the inertial force as well as the distance to the obstacle visually perceived by the driver.

In a case where the automatic parking process is suspended such that the automatic parking process is resumable, the touch panel 32 displays the inquiry as to whether to resume the automatic parking process. Accordingly, the driver can quickly choose whether to resume or cancel the automatic parking process.

When the automatic parking process is resumed after the suspension thereof, the vehicle is prevented from suddenly starting to move since the driver needs to release the operation on the brake pedal 24 in an operated state.

Even if the obstacle approaches the vehicle, the automatic parking process can be executed quickly without being stopped or suspended as the driver operates the brake pedal 24. Accordingly, the driver can be motivated to monitor the surroundings and perform the brake operation.

Even if the obstacle enters the warning area 53, the automatic parking process can be continued while the control device 15 decelerates or stops the vehicle and/or the notification or the warning is given. Accordingly, it is possible to prompt the driver to pay attention while preventing the time required for the automatic parking process from being increased.

Concrete embodiments of the present invention have been described in the foregoing, but the present invention should not be limited by the foregoing embodiments and various modifications and alterations are possible within the scope of the present invention. For example, the control device may not set the warning area. Further, the inquiry as to whether to resume the automatic parking process after the suspension thereof may be made not by displaying a message on the touch panel but by issuing a message from the sound generating device, and the input for the resumption or cancellation of the automatic parking process may be performed on an input device other than the touch panel. The brake sensor may not be a stroke sensor that directly acquires the operation amount (the pressing amount) of the brake pedal, and may be a device that estimates the operation amount of the brake pedal based on the change in the hydraulic pressure of the brake device. Alternatively, the brake sensor may be a device that captures an image of the brake pedal with a camera or the like and acquires the operation amount of the brake pedal based on the captured image.

The invention claimed is:

1. A parking assist system mounted on a vehicle including a powertrain, a brake device, and a steering device, the parking assist system comprising:
    an external environment sensor configured to detect an obstacle present around the vehicle;
    a brake pedal operated by a driver to activate the brake device;
    a brake sensor configured to acquire an operation amount of the brake pedal;
    a control device configured to acquire a position of the obstacle with respect to the vehicle based on a detection result of the external environment sensor, and to control an automatic parking process to autonomously move the vehicle from a current position to a target position and to stop the vehicle; and
    an input/output device configured to notify the driver of information and to receive an input operation by the driver,
    wherein the control device is configured to set a cancellation area within a prescribed range from the vehicle and a suspension area located outside the cancellation area, and
    while executing the automatic parking process, the control device
    continues the automatic parking process as the driver releases an operation on the brake pedal in a case where the obstacle is detected in the suspension area and the operation amount of the brake pedal by the driver has been equal to or more than a second threshold to cause the brake device to generate a second brake force,
    causes the brake device to stop the vehicle with the second brake force and then suspends the automatic parking process such that the automatic parking process is resumable in a case where the obstacle is detected in the suspension area and the operation amount of the brake pedal by the driver is less than the second threshold, and
    causes the brake device to stop the vehicle with a first brake force and then cancels the automatic parking process such that the automatic parking process is not resumable in a case where the obstacle is detected in the cancellation area and the operation amount of the brake pedal by the driver is less than a first threshold to cause the brake device to generate the first brake force.

2. The parking assist system according to claim 1, wherein while executing the automatic parking process, the control device continues the automatic parking process as the driver releases the operation on the brake pedal in a case where the obstacle is detected in the cancellation area and the operation amount of the brake pedal by the driver has been equal to or more than the first threshold.

3. The parking assist system according to claim 1, wherein the second brake force is smaller than the first brake force.

4. The parking assist system according to claim 1, wherein in a case where the control device suspends the automatic parking process such that the automatic parking process is resumable, the input/output device notifies the driver of an inquiry as to whether to resume the automatic parking process.

5. The parking assist system according to claim 4, wherein in the case where the control device suspends the automatic parking process such that the automatic parking process is resumable, the input/output device receives the input operation to resume the automatic parking process, and the control device resumes the automatic parking process as the operation on the brake pedal in an operated state is released.

6. The parking assist system according to claim 1, wherein the control device is configured to further set a warning area located outside the suspension area with respect to the vehicle, and
    while executing the automatic parking process, the control device
    continues the automatic parking process as the driver releases the operation on the brake pedal in a case where the obstacle is detected in the warning area and the operation amount of the brake pedal by the driver has been equal to or more than a third threshold to cause the brake device to generate a third brake force smaller than the second brake force, and
    continues the automatic parking process while decelerating or stopping the vehicle with the third brake force and/or causing the input/output device to notify the driver that the obstacle is detected in a case where the obstacle is detected in the warning area and the operation amount of the brake pedal by the driver is less than the third threshold.

* * * * *